Oct. 16, 1928.

K. VON KANDÓ

1,687,700

PLANT WORKING WITH INDUCTION MOTOR FED FROM SYNCHRONOUS PHASE CONVERTER

Filed April 22, 1925

Inventor:
Kálmán von Kandó
by Emery, Booth, Janney, Varney,
Attys.

Patented Oct. 16, 1928.

1,687,700

UNITED STATES PATENT OFFICE.

KALMAN von KANDÓ, OF BUDAPEST, HUNGARY, ASSIGNOR TO WESTINGHOUSE ELECTRIC & MANUFACTURING COMPANY, A CORPORATION OF PENNSYLVANIA.

PLANT WORKING WITH INDUCTION MOTOR FED FROM SYNCHRONOUS PHASE CONVERTER.

Application filed April 22, 1925, Serial No. 25,063, and in Hungary May 28, 1924.

The invention relates to a starting device for induction motors which are fed from the current net by means of a synchronous phase converter so that by regulating the excitation of the phase converter, the terminal voltage of the motor can be adjusted to the load at that moment in such a manner that the power factor in the primary circuit of the phase converter may be kept at a predetermined value, for instance, unity $\cos \varphi = 1$ throughout the whole range of load. In such arrangements, the controlling member which controls the starting rheostat, for instance, a control switch or servomotor, is placed under the control of a wattmeter influenced by the load on the motor and of an opposing force variable at will, for instance a spring, in such a manner that the normal position of the controlling member is determined by the equilibrium of the two opposing forces operating upon it.

Figure 1:
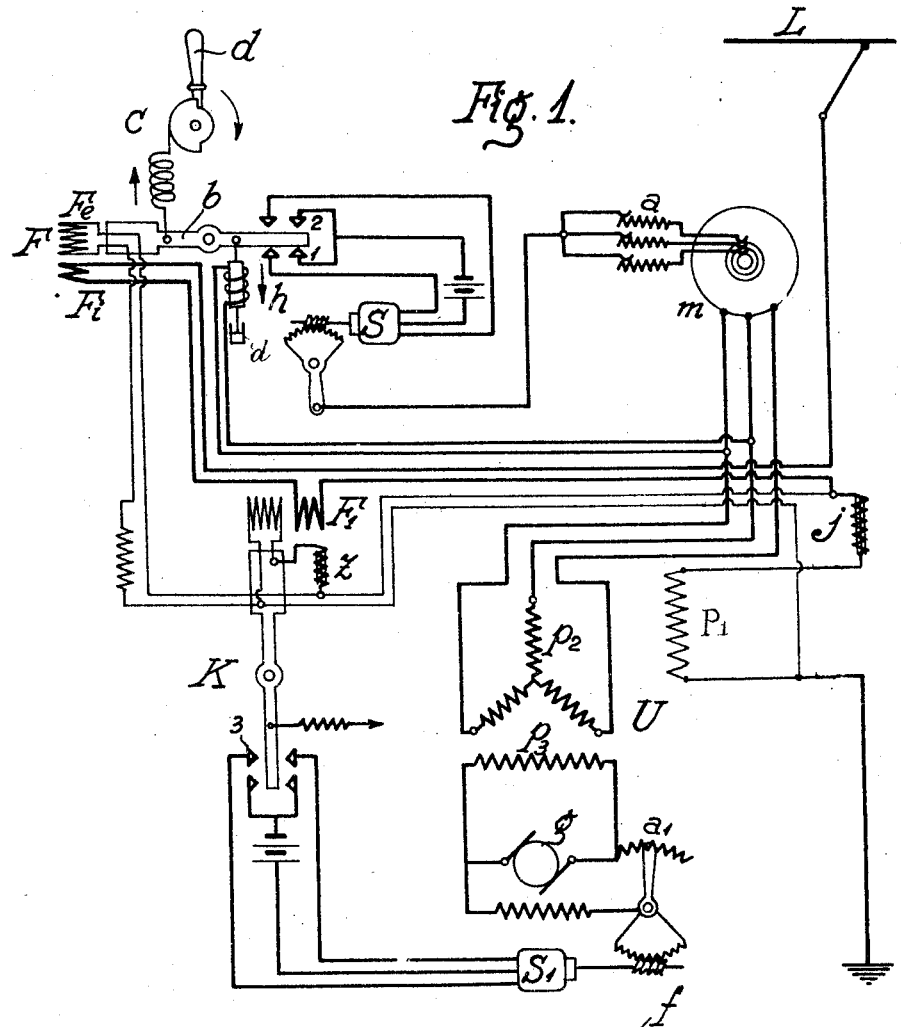
Fig. 1 is a diagrammatic view of circuits and apparatus embodying my invention.

In Fig. 1 a controlling device is shown schematically. S is a servomotor which drives the starting rheostat $a$ of the induction motor $m$. The motor $m$ is fed from the synchronous phase converter U, the primary winding $p_1$ of which may, for instance, be single phase, while the secondary winding $p_2$ is polyphase. In the primary circuit $p_1$ of the phase converter is a high self-induction $j$ which permits the alteration of the terminal voltage of the secondary of the phase converter while the primary voltage remains the same. $p_3$ is the exciting winding of the phase converter. The lever $b$ on moving in one or other direction out of the normal position shown in the drawing secured by a weight, a spring or any other force, closes the contacts 1 or 2 whereby the servo-motor S for the starting rheostat is rotated in one or other direction. The lever $b$ is on the one hand under the control of the spring $c$ which can be stretched more or less, for instance by turning the starting lever $d$, and on the other hand under the control in the opposite direction of the wattmeter F of which the one coil located on the lever $b$, for instance $F_e$, receives current at the terminal voltage of the phase converter, while the stationery coil $F_1$ is traversed by the main current of the phase converter.

In order to start the motor, the spring $c$ is stretched by turning the starting lever $d$ in the direction of the arrow so that the lever $b$ deflects and by closing the contact 1 starts the servo-motor S in such a sense that the resistance of the starter $a$ of the motor $m$ is gradually reduced. Simultaneously with the increase of the load on the motor, the regulating switch K which is controlled in accordance with the load on the phase converter by the wattmeter $F_1$ in the primary circuit of the phase converter closes the contact 3 whereby the auxiliary motor $S_1$ is operated in a sense to reduce the resistance of rheostat $a_1$ of the exciter $g$ of the phase converter U, and therefore increases the excitation. Hence the voltage of the current fed to the motor $m$ by the phase converter is increased.

It should be understood that the regulation of the excitation of the phase converter must follow the increase of load sufficiently quickly so that in case the resistance of the starting rheostat $a$ of the induction motor should be cut out too quickly there shall be no danger of the phase converter becoming overloaded before its excitation has reached such a value as to ensure that it does not fall out of phase. The phase converter has a certain amount of stability dependent upon its excitation, that is to say, it will not fall out of phase if the load does not exceed the highest value corresponding to its excitation at that moment. The range of stability is however, proportionately very small for small excitation, i. e. when the motor is running with practically no load and only gradually increases with increase of excitation. Synchronous phase converters are often designed with a comparatively small short circuit current so that they only possess a very small over load capacity. In consequence of excessive stretching of the spring $c$ too great a load might be thrown on the motor which might have the result that the phase converter would fall out of phase. The controlling arrangements described above which have been employed hitherto attempt to compensate for overload after it has once occurred by supplementary increase of the excitation of the phase converter or by the consequent increase of the terminal voltage of the induction motor.

This method of control, however, does not produce the desired effect. In the case of an overload having occurred which has gone outside the range of stability of the motor with the excitation at that moment, further increase of the voltage can no longer tend to produce stability. This is because with a given resistance of the starter, the load increases as the square of the current, and in consequence of this, with increase of voltage the load on the motor and on the phase converter increases at a greater rate than the range of stability of the phase converter, so that under these circumstances increase of the excitation is unable to make up for increase of load.

The invention relates to an arrangement which overcomes this drawback in that it prevents greater load being applied to the induction motor and hence to the phase converter when the motor is started than corresponds to the terminal voltage impressed, at any particular moment, on the motor by the phase converter, that is to say than corresponds to the excitation of the phase converter at that moment. In consequence of this, the phase converter cannot be overloaded beyond the range of stability corresponding to its excitation at that moment, and there is, therefore, no danger that it will fall out of phase.

The invention consists in that the controlling member which is governed by a wattmeter operated in accordance with the load on the motor or on the phase converter is also subjected to the action of a force automatically variable in accordance with the momentary terminal voltage of the motor. Preferably there is provided in addition to this operating force which is automatically variable in proportion to the terminal voltage of the motor, another force operating in the same direction, but variable at will by means of a device serving to start the motor.

The drawing shows in a schematic manner one embodiment of this latter arrangement. According to the example shown in Fig. 1, the spring $c$ the tension of which is variable by means of the starting lever $d$ and which operates on the control lever $b$ in opposition to the wattmeter F is retained and there is provided in addition a solenoid $h$ also operating on the control lever $b$ in opposition to the wattmeter F and exerting a force which varies automatically in proportion to the terminal voltage of the motor $m$. For this purpose the winding of the solenoid is fed either directly or indirectly from the terminals of the secondary winding $P_2$ of the phase converter U. Clearly, however, any desired means can be employed to make the variable controlling force in opposition to the wattmeter F dependent upon the momentary terminal voltage of the motor $m$. This dependence need not be such that the controlling force varies directly in accordance with the terminal voltage, but it will be sufficient if it simply increases when the terminal voltage increases or even changes in the opposite direction with alterations of the terminal voltage.

Since for each excitation the converter has a definite range of stability which increases in extent as the excitation increases, the alteration of the said controlling force need not follow exactly the alteration of terminal voltage, but the important point is that the alteration of the controlling force $h$ shall take place substantially at the same time as the alteration of the terminal voltage of the motor $m$. Obviously the coincidence in point of time also need not be exact. On the contrary it is desirable that the alteration of the controlling force $h$ should lag with respect to the alteration of the terminal voltage of the motor, which can be brought about, for instance, by means of a dash pot $d$. Although it is most convenient to control the automatically variable opposing force $h$ directly from the terminal voltage of the motor, it can be made dependent upon any other member which in its turn is in a condition of dependence on the terminal voltage of the motor. Since, however, the alteration of the terminal voltage of the motor will follow the alterations of the regulating resistance $a_1$ with a certain inertia, this inertia must be taken into account in ensuring that the delay in the alteration of the opposing force $h$ is made sufficiently great by means of dashpots or the like.

Figure 2:
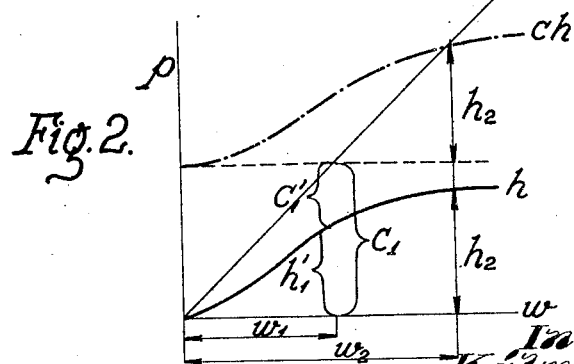
Fig. 2 is a curve diagram referred to hereinafter.

The operation of the automatic regulating force $h$ is shown in Fig. 2 in which the axis of abscissæ $w$ represents the load on the motor and the axis of ordinates $p$ represents forces acting on the control lever $b$. The straight line $f$ passing through the origin of coordinates indicates the relation between the force exerted by the wattmeter on the control lever $b$ and the load on the motor. If it is desired to give the tension $c_1$ to the spring $c$ in the absence of any additional automatic regulating force $h$, the load on the motor must have the value $w_1$ in order that the operation of the wattmeter F may produce equilibrium. If, however, the additional force $h$ acts on the control lever $b$ the relations are determined as follows:—

If the automatic voltage regulation of the terminal voltage of the motor takes place in such a manner that the square of the terminal voltage is proportional to the momentary load or in such a manner that the power factor in the primary circuit of the phase converter throughout the whole range of load is equal to unity ($\cos \varphi = 1$), the voltage and therefore the variable additional opposition force $h$ which is proportional to it, will increase with the load according to the curve $h$ in Fig. 2. If now the effect of the force $h$ and the effect of the spring $c$ are added, as indicated in the chain-dotted curve, for equilibrium the wattmeter F must exert a force $c_1 + h_2$ equal to the combined effects of the value $c_1$ of the tension of the spring $c$ and the value $h_2$ of the regulating force $h$ corresponding to the value $w_2$ of the load, so that for the value $w_1$ of the load the spring need only have the value $c'_1$ in order to produce equilibrium with the value $h'_1$ of the opposing force $h$ together with the wattmeter F with load $w_1$. From this it follows that a considerably weaker spring $c$ may be employed. As a consequence of this, the spring $c$ may be made so weak that even if it should be given its greatest tension by means of the starting lever $d$ at the beginning of the starting operation, the load on the motor sufficient to balance this spring tension, i. e. the load on the phase converter, would fall within the range of stability of the phase converter. The phase converter, therefore, cannot fall out of phase as a result of the sudden application of the maximum tension of the spring $c$, and of the application of load on the phase converter thus effected. The phase converter thus remains in phase even with a sudden application of the whole spring tension, whereby the excitation of the phase converter and in consequence, also the terminal voltage of the motor, gradually rise automatically. In consequence of this increase of terminal voltage, there is also an increase in the controlling force $h$ which assists the tension of the spring $c$ and allows the value of the load $w$ which balances the combined effect of the tension of the spring $c$ and the additional controlling force $h$ to rise gradually. The increase of the controlling force $h$ continues until the load has reached the maximum value corresponding to the tension of the spring $c$ together with the additional controlling force $h$ corresponding to this maximum value.

The highest attainable value of the load is in this case determined by two quantities: firstly, a force which can be varied at will by means of the starting lever, e. g. the tension of spring $c$, and secondly, the automatically variable additional controlling force $h$ proportional to the instantaneous terminal voltage of the motor. In order to be able to vary the maximum value of the load, it is possible to vary at will either the tension of the spring or the initial value of the controlling force automatically variable with the terminal voltage, or both these factors.

In the drawing the first case is shown, in which the starting lever $d$ controls the tension of the spring $c$. Clearly the spring $c$ serves merely as an example and can be replaced by any desired force, for instance, a weight.

As has already been mentioned, the spring $c$ can be entirely omitted if the control lever $b$ or the controlling member performing the same functions is so arranged that in its normal position when neither the wattmeter F nor the control force $h$ acting in opposition to it are in operation, it is in a position to reduce the starting resistance.

The foregoing and other changes may be made without departing from the spirit of my invention, and I desire that the appended claims shall be given the broadest interpretation commensurate with their language and the prior art.

Having now particularly described and ascertained the nature of my said invention and in what manner the same is to be performed, I declare that what I claim is:—

1. An electrical system comprising, in combination, an induction motor, a synchronous phase-converter feeding said motor, said converter having an exciting circuit, means for regulating the exciting effect of said exciting circuit to vary the terminal voltage on said motor in accordance with the load, a starting device for the motor, and means for automatically regulating the starting effect of said starting device in accordance with the terminal voltage on the motor and the load.

2. An electrical system comprising, in combination, an induction motor, a synchronous phase-converter feeding said motor, said converter having an exciting circuit, means for regulating the exciting effect of said exciting circuit to vary the terminal voltage on said motor in accordance with the load, a starting device for said motor comprising a starting resistance, and controlling means for said starting resistance governed by the load and the terminal voltage of said motor.

3. An electrical system comprising, in combination, an induction motor, a synchronous phase-converter feeding said motor, said converter having an exciting circuit, means for regulating the exciting effect of said exciting circuit to vary the terminal voltage on said motor in accordance with the load, a starting device for said motor comprising a starting resistance, controlling means for said starting resistance governed by the load and the terminal voltage of said motor, and means for manually regulating the effect of said controlling means.

4. An electrical system comprising, in combination, an induction motor, a synchronous phase-converter feeding said motor, said converter having an exciting circuit, means for regulating the exciting effect of said exciting circuit to vary the terminal voltage, a starting device for said motor, means for governing said starting device comprising means subjected to an equilibrium of forces, said last-mentioned means including electro-responsive means for developing a force which increases with the terminal voltage and electro-responsive means for developing an opposing force which increases with the load.

5. An electrical system comprising, in combination, an induction motor, a synchronous phase-converter feeding said motor, said converter having an exciting circuit, means for regulating the exciting effect of said exciting circuit to vary the terminal voltage, a starting device for said motor, means for regulating said starting device comprising electro-responsive means for developing a force which increases with the terminal voltage, electro-responsive means for developing an opposing force which increases with the load, and means for retarding the action of certain changes in one of said forces.

6. An electrical system comprising, in combination, an induction motor, a synchronous phase-converter feeding said motor, said converter having an exciting circuit, means for regulating the exciting effect of said exciting circuit to vary the terminal voltage, a starting device for said motor, means for regulating said starting device comprising electro-responsive means for developing a force which increases with the terminal voltage, electro-responsive means for developing an opposing force which increases with the load, and manually adjustable means for altering the equilibrium of forces at will.

7. The combination with a transmission line and an energy-translating device, of variably excited synchronous converting apparatus therebetween, and means responsive to an exciting flux in said synchronous converting apparatus for limiting the output thereof in accordance with the excitation conditions.

8. The combination with a transmission line and an energy-translating device, of variably excited synchronous converting apparatus therebetween, load-controlling means responsive to a force corresponding to the load and an opposing force corresponding to the degree of excitation.

9. The combination with a transmission line and an energy-translating device, of variably excited synchronous converting apparatus therebetween, load-controlling means responsive to a force corresponding to the load and an opposing force corresponding to the degree of excitation, and manually adjustable means for so changing the equilibrium of forces as to reduce the output at will.

10. The combination with a transmission line and an energy-translating device, of variably excited synchronous converting apparatus therebetween, the synchronizing power of said apparatus varying with the excitation, and load-limiting means responsive to a force corresponding to the load and an opposing force corresponding to a voltage generated within said synchronous apparatus, said load-limiting means being automatically operative on said energy-translating device for limiting its maximum possible load in some proportion to said voltage generated within said synchronous apparatus.

11. The combination of a variably excited synchronous machine, an electric motor adapted to be energized therefrom, a multi-position starting regulating device for said motor, mechanical actuating means for adjusting said starting regulating device, and electro-responsive controlling means for starting, stopping and reversing said actuating means, said controlling means being responsive to an equilibrium of forces and including means for developing a force in accordance with the effective excitation of said synchronous machine and means for developing an opposing force in accordance with the load.

12. The combination of a variable-voltage source, an electric motor adapted to be energized therefrom, a multi-position starting regulating device for said motor, mechanical actuating means for adjusting said starting regulating device, and electro-responsive controlling means for starting, stopping and reversing said actuating means, said controlling means being responsive to an equilibrium of forces and including means for developing a force in accordance with the voltage and means for developing an opposing force in accordance with the load.

13. The combination of a variable-voltage source, an electric motor adapted to be energized therefrom, a multi-position starting regulating device for said motor, mechanical actuating means for adjusting said starting regulating device, and electro-responsive controlling means for starting, stopping and reversing said actuating means, said controlling means being responsive to an equilibrium of forces and including means for developing a force in accordance with the voltage and means for developing an opposing force in accordance with the load, and manually adjustable means for so changing the equilibrium of forces as to reduce the output at will.

14. The combination of a variable-voltage source, an electric motor adapted to be energized therefrom, a multi-position starting regulating device for said motor, mechanical actuating means for adjusting said starting regulating device, and electro-responsive controlling means for starting, stopping and reversing said actuating means, said controlling means being responsive to an equilibrium of forces and including means for developing a force in accordance with the voltage and means for developing an opposing force in accordance with the load, and a manually adjustable controller for applying a variable force to said equilibrium means, according to the position of the controller, whereby the ultimate load may be pre-selected at will, within the limits of the electro-responsive apparatus.

15. The combination with a variable-voltage electric motor, of a multi-position regulating device therefor, a servo-motor for adjusting said regulating device, a controlling device for developing a force in response to both the current and the voltage of the motor, yieldable means for developing an opposing force, and means responsive to both of said forces for controlling said servo-motor.

16. The combination with a variable-voltage electric motor, of a multi-position regulating device therefor, a servo-motor for adjusting said regulating device, a controlling wattmeter for developing a force in response to the load, yieldable means for developing an opposing force, means responsive to both of said forces for controlling said servo-motor, and a manually adjustable controller for causing an adjustment of the relative magnitudes of said forces.

In testimony whereof I affix my signature.

Dr. KALMAN von KANDÓ.